US011699185B2

(12) United States Patent
Asharov et al.

(10) Patent No.: US 11,699,185 B2
(45) Date of Patent: Jul. 11, 2023

(54) SYSTEMS AND METHODS FOR PRIVACY-PRESERVING INVENTORY MATCHING

(71) Applicant: JPMORGAN CHASE BANK, N.A., New York, NY (US)

(72) Inventors: Gilad Asharov, New York, NY (US); Tucker Richard Balch, Suwanee, GA (US); Hans Buehler, London (GB); Richard Hua, Millburn, NJ (US); Antigoni Ourania Polychroniadou, New York, NY (US); Maria Manuela Veloso, Pittsburgh, PA (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 158 days.

(21) Appl. No.: 17/110,253

(22) Filed: Dec. 2, 2020

(65) Prior Publication Data
US 2021/0174441 A1   Jun. 10, 2021

(30) Foreign Application Priority Data
Dec. 6, 2019  (GR) .............................. 20190100549

(51) Int. Cl.
| G06Q 40/00 | (2023.01) |
| G06Q 40/04 | (2012.01) |
| G06Q 30/08 | (2012.01) |
| G06Q 20/38 | (2012.01) |
| G06Q 20/40 | (2012.01) |
| G06Q 40/02 | (2023.01) |
| H04L 9/00  | (2022.01) |

(52) U.S. Cl.
CPC ........... *G06Q 40/04* (2013.01); *G06Q 20/383* (2013.01); *G06Q 20/3829* (2013.01); *G06Q 20/401* (2013.01); *G06Q 30/08* (2013.01); *G06Q 40/02* (2013.01); *H04L 9/008* (2013.01); *G06Q 2220/00* (2013.01); *H04L 2209/46* (2013.01)

(58) Field of Classification Search
None
See application file for complete search history.

(56) References Cited

U.S. PATENT DOCUMENTS 9,064,256 B2 *   6/2015  Foley .................... G06Q 30/06
2008/0275808 A1  11/2008  Mackay
(Continued)

OTHER PUBLICATIONS

International Search Report and Written Opinion of the International Searching Authority, dated Dec. 6, 2019, from corresponding International Application No. PCT/US2020/063416.

*Primary Examiner* — Olabode Akintola
(74) *Attorney, Agent, or Firm* — Greenburg Traurig LLP (57) ABSTRACT

Systems and methods for privacy-preserving inventory matching are disclosed. In one embodiment, in an information processing apparatus comprising at least one computer processor, a method for inventory matching may include: (1) receiving, from each of a plurality of clients, a masked submission comprising an identification of at least one security to buy or sell and a desired quantity to buy or sell; (2) aggregating the masked submissions resulting in a sum of the desired quantities to buy or sell; (3) matching at least two of the clients to conduct a transaction based on aggregation and their respective masked submissions; and (4) conducing the transaction between the matched clients.

11 Claims, 8 Drawing Sheets

(56) References Cited

U.S. PATENT DOCUMENTS

| | | |
|---|---|---|
| 2009/0177591 A1 | 7/2009 | Thorpe et al. |
| 2014/0279359 A1* | 9/2014 | MacInnes .............. G06Q 40/06 705/37 |
| 2015/0213079 A1* | 7/2015 | Shukla ................ G06F 16/2365 707/687 |

* cited by examiner

```
Client: trying to connect to server : 172.31.25.210 , port: 2004
Number of Clients: 3, recived identity: 0

Generating public keys...
    pk[0,0] = None
    pk[0,1] = b'p<\xac\x33N*8\xb9j\xb18\x9dC\xea?5\x08\xe5:2\x06\x7fT\xf8kD \x1e\xbbs\xa8\x19'
    pk[0,2] = b'\x8f\x80\xe9P\xff9\x67\x135M\x86\x8b\x07\xb3\x8M\xeb\xf50\x97\xb8?\x1b\x03\xad?\xbe\xcey\x9d\xc7w'
Sending pks to the server.
Waiting to receive all other pks from the server...

Client 0: receiving all public keys associated with
    pk[0,0] = None
    pk[1,0] = b'\r\x8b\xfa\x9e\xb5\x03\\xb0\x17\x193,v=\xd6\xde\x02\x91\x12\x11,3:[3\xb2C\xfb=\x92g'
    pk[2,0] = b'\x98\x11\x92p\xb1\xe1H\x17\xf7\x89\xff{K\xf3\xcc\x00\xea5\xf1x-\xe4\xc9\xbf\x1b\xd6\x07x\xa0s/'

Computing common keys and store them locally (no output to the server)
    key[0,0] = None
    key[0,1] = 29215517266862271942671963569085536041342950479807442169963837703811637608523
    key[0,2] = 62542472008594428211671012849821334233354497785908363419676736616317205083623
```

FIGURE 5

```
please provide input CSV file
default = "Client0InputCSV.csv", input "r" for generating randomly
Your choice:$
Using file: Client0InputCSV.csv
Registering the input at the server Client0
  Symbol    Long   Short   LongMasked  ShortMasked
0   AABA  1687000      0   1939730290  1341493857 3
1    AAL    10000      0   7338262038  3350620266
2   AAME       0  700000   1394907780 9  4547722900
3   AAOI    80000      0   801992061 9  4255899991
4   AAON  8329000      0   216470016 5  7384933173

MaskedLong and MaskedShort are sent to the server

Waiting that other clients will register their input at the server....
```

FIGURE 6

Result of aggregation among all clients, revealed only to the server:

| | Symbol | Security Name | | Long | Short | Matched |
|---|---|---|---|---|---|---|
| 0 | AABA | Altaba Inc. | - Common Stock | 8074000 | 687000 | 687000 |
| 1 | AAL | American Airlines Group, Inc. | - Common Stock | 250000 | 344000 | 250000 |
| 2 | AAME | Atlantic American Corporation | - Common Stock | 766000 | 1566000 | 766000 |
| 3 | AAOI | Applied Optoelectronics, Inc. | - Common Stock | 138000 | 48000 | 48000 |
| 4 | AAON | AAON, Inc. | - Common Stock | 8358000 | 829000 | 829000 |

FIGURE 7

Client2: output:

| | Symbol | | Security Name | Requested | Side | Matched | (%)-Matched |
|---|---|---|---|---|---|---|---|
| 0 | AABA | Altaba Inc. | - Common Stock | 6387000 | L | 687000 | 10 |
| 1 | AAL | American Airlines Group, Inc. | - Common Stock | 344000 | S | 250000 | 72 |
| 2 | AAME | Atlantic American Corporation | - Common Stock | 766000 | L | 766000 | 100 |
| 3 | AAOI | Applied Optoelectronics, Inc. | - Common Stock | 48000 | S | 48000 | 100 |
| 4 | AAON | AAON, Inc. | - Common Stock | 29000 | L | 29000 | 100 |

Long:   1482000 / 7182000   Matched:  20.63 %
Short:   298000 /  392000   Matched:  76.02 %
Total:  1780000 / 7574000   Matched:  23.50 %

FIGURE 8A

Running two party min with client: 2
Executing:

| | Symbol | | Security Name | Matched | Side |
|---|---|---|---|---|---|
| 0 | AABA | Altaba Inc. | - Common Stock | 687000 | L |
| 1 | AAL | American Airlines Group, Inc. | - Common Stock | 250000 | S |
| 2 | AAME | Atlantic American Corporation | - Common Stock | 766000 | L |
| 3 | AAOI | Applied Optoelectronics, Inc. | - Common Stock | 48000 | S |
| 4 | AAON | AAON, Inc. | - Common Stock | 29000 | L |

FIGURE 8B

SYSTEMS AND METHODS FOR PRIVACY-PRESERVING INVENTORY MATCHING

RELATED APPLICATIONS

The present application claims priority to, and the benefit of, Greek Patent Application Number 20190100549, filed Dec. 6, 2019, the disclosure of which is hereby incorporated, by reference, in its entirety.

BACKGROUND OF THE INVENTION

1. Field of the Invention

Embodiments are generally directed to systems and methods for privacy-preserving inventory matching.

2. Description of the Related Art

An "axe" is an interest in a particular security that a firm is looking to buy or sell. In general, the firm providing that axe would prefer to keep the information private as it provides an indication of the direction they want to trade a particular security. If other market participants are informed of how a particular firm is axed in a given security, they can in essence offer the security at an unfavorable price or drive the price of the security in a more disadvantageous direction before the firm can transact. As a result, firms keep their axes secret.

When a bank finds two clients that are interested in the same security but with opposite direction (i.e., one is interested to buy and the other is interested to sell), then the bank can offer the two clients to trade internally and without impacting the market price adversely to either client. If the bank cannot find two matching clients, then the bank has to perform the trade in the public market which introduces some additional cost and could impact the price. Banks therefore put efforts in locating internalized matches.

In order to incentivize clients to trade synthetically, banks publish a list of securities that they are interested in trading. This "axe list" provides the bank's clients the ability to locate available synthetic trades at reduced financing rates and as a result, increase trading activity and achieve better internalization. In order to construct this list, the publishing bank aggregates internal firm inventory along with risk inventory resulting from facilitating client trades. This is, however, somewhat unsatisfactory, as (1) the bank reveals its inventory and in fact, leaks its own axe; and (2) the trading activity of clients that contribute to the list is somewhat revealed to other clients even though the list is anonymized and includes aggregated information.

SUMMARY OF THE INVENTION

Systems and methods for privacy-preserving inventory matching are disclosed. In one embodiment, in an information processing apparatus comprising at least one computer processor, a method for inventory matching may include: (1) receiving, from each of a plurality of clients, a masked submission comprising an identification of at least one security to buy or sell and a desired quantity to buy or sell; (2) aggregating the masked submissions resulting in a sum of the desired quantities to buy or sell; (3) matching at least two of the clients to conduct a transaction based on aggregation and their respective masked submissions; and (4) conducing the transaction between the matched clients.

In one embodiment, the submissions may be masked with common keys for the plurality of clients.

In one embodiment, the submissions may be submitted using a secure Multi-Party Computation (MPC) cryptographic protocol.

In one embodiment, the submissions may be submitted using an additive or fully homomorpic encryption scheme.

In one embodiment, the identities of the clients may not be revealed until the clients' submissions are matched.

In one embodiment, a secure Multi-Party Computation (MPC) cryptographic protocol may be used to implement a matching algorithm, and wherein each respective buy order and each respective sell order may be transmitted in an encrypted way based on an instruction that relates to the MPC cryptographic protocol.

In one embodiment, an additive homomorpic encryption scheme may be used to implement a matching algorithm, and wherein each respective buy order and each respective sell order is transmitted in an encrypted way based on an instruction that relates to the additive homomorpic encryption scheme.

In one embodiment, one of the matched clients may be a bank, an online client, a failstop client, etc.

In one embodiment, one of the clients may commit to executing a transaction order when its submission is matched with another client. In another embodiment, one of the client may not commit to executing a transaction order when its submission is matched with another client.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION OF PREFERRED EMBODIMENTS

Embodiments are directed to systems and methods for privacy-preserving inventory matching.

In embodiments, clients may submit their intended transactions, including the size and intended direction (long/buy, or short/sell) in encrypted messages. The messages may be encrypted in such a way that an operator (e.g., a bank or other financial institution) cannot decrypt the messages. The operator, in concert with the clients, determines if any matches are possible, and between which clients the matches are possible. The identities of the matching parties may only be revealed to the operator in the case when a match is possible. Thus, when there are no matches, or the client requests are only partially filled, the un-matched information is not revealed.

In embodiments, cryptographic techniques are used to assist the operator in locating potential clients without the clients revealing the clients' axe lists. For example, protocols may be used that allow the operator and a client to collaborate and to jointly compute whether any securities that the client wishes to buy or sell are available in the operator's axe list, without the client revealing what is interested to buy or sell, and without the operator revealing information about its axe list. Importantly, the operator does not learn any information about what the client is interested in on any security that is not matched, and likewise, the client does not learn any information on what is available unless it is interested in that as well. Only after matches are found, the bank and the client are notified and the joint interest is revealed.

According to one embodiment, bank-to-client inventory matching is disclosed. For example, a secure two-party (e.g., bank to client) inventory matching, based on techniques from two-party secure computation, are disclosed such that the bank's axe list and the client's axes are provided in an encrypted way to a matching engine.

According to another embodiment, client-to-client inventory matching is disclosed. For example, a secure multi-party (e.g., client to client) inventory matching, based on techniques from multi-party secure computation, is disclosed where the clients' axes are encrypted.

According to another embodiment, indicative inventory matching is disclosed. For example, the bank-to-client and client-to-client secure inventory matching protocols may be used in cases where orders are firm (i.e., a match is found, the order should be executed). Embodiments provide protocols that indicative orders in which the clients do not commit to executing a matching order.

According to another embodiment, inventory matching with fail-stop clients is disclosed. For example, secure protocols are disclosed for cases in which clients stop responding (e.g., they either go offline or their computer is disconnected) during the execution of the protocol.

Figure 1:
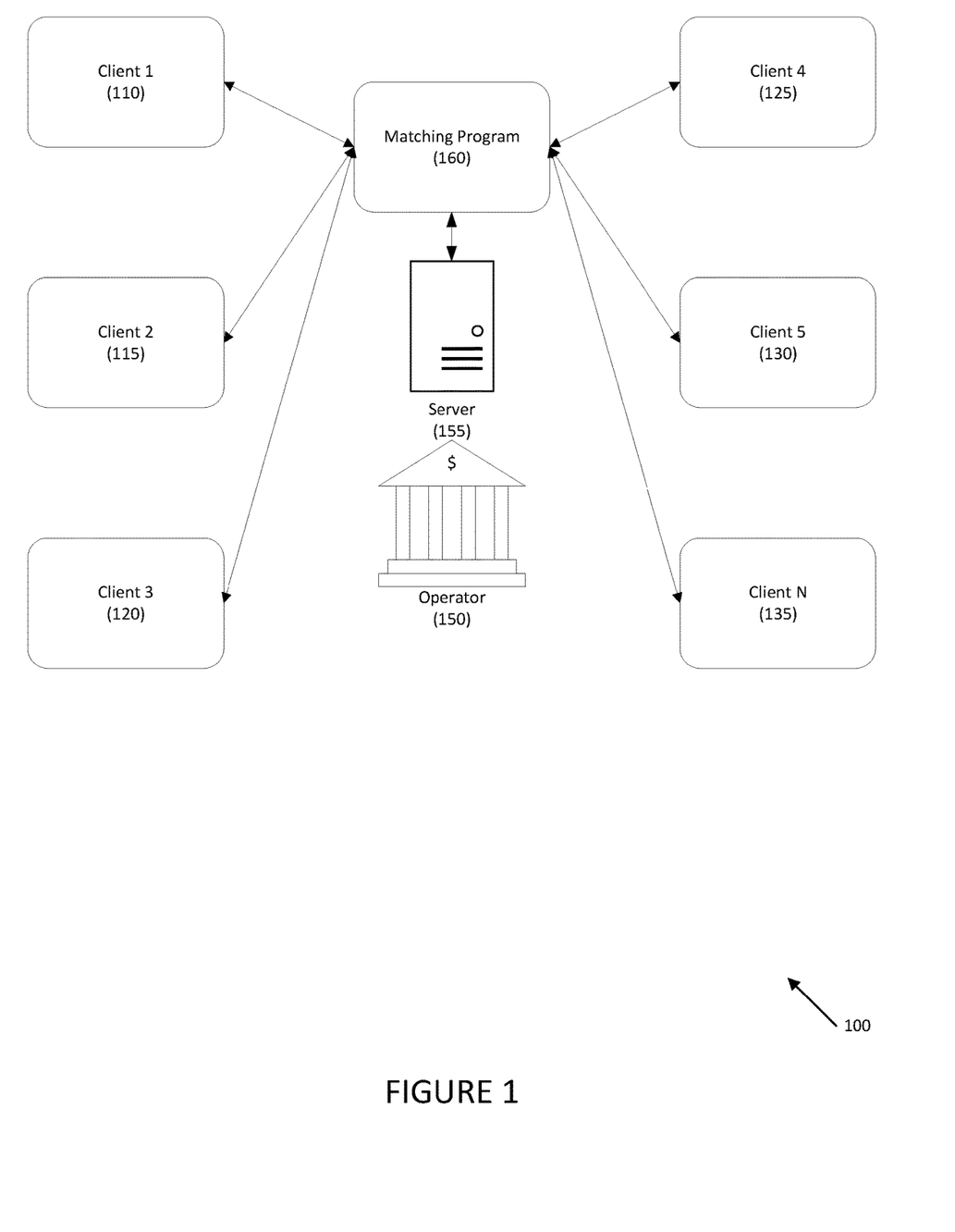
FIG. 1 depicts a system for privacy-preserving inventory matching according to one embodiment.

Referring to FIG. 1, a system for privacy-preserving inventory matching is disclosed according to one embodiment. System 100 may include a plurality of clients (e.g., clients 110, 115, 120, 125, 130, 135), operator 150 (e.g., a bank or financial institution), operator server 155, and matching computer program or application 160.

Although FIG. 1 depicts six clients, this is exemplary only and it should be recognized that a greater or fewer number of clients may be provided as is necessary and/or desired.

In one embodiment, one or more of clients 110, 115, 120, 125, 130, and 135 may be clients of, or associated with, operator 150. In another embodiment, one or more of clients 110, 115, 120, 125, 130, and 135 may not be associated with operator 150.

In embodiment, operator 150 may host one or more server 155, which may be physical servers, cloud-based servers, etc. In one embodiment, server 155 may execute matching computer program or application 160 that may match encrypted trades submitted by clients 110, 115, 120, 125, 130, and 135, and may executed at least partially matching trades.

Figure 2:
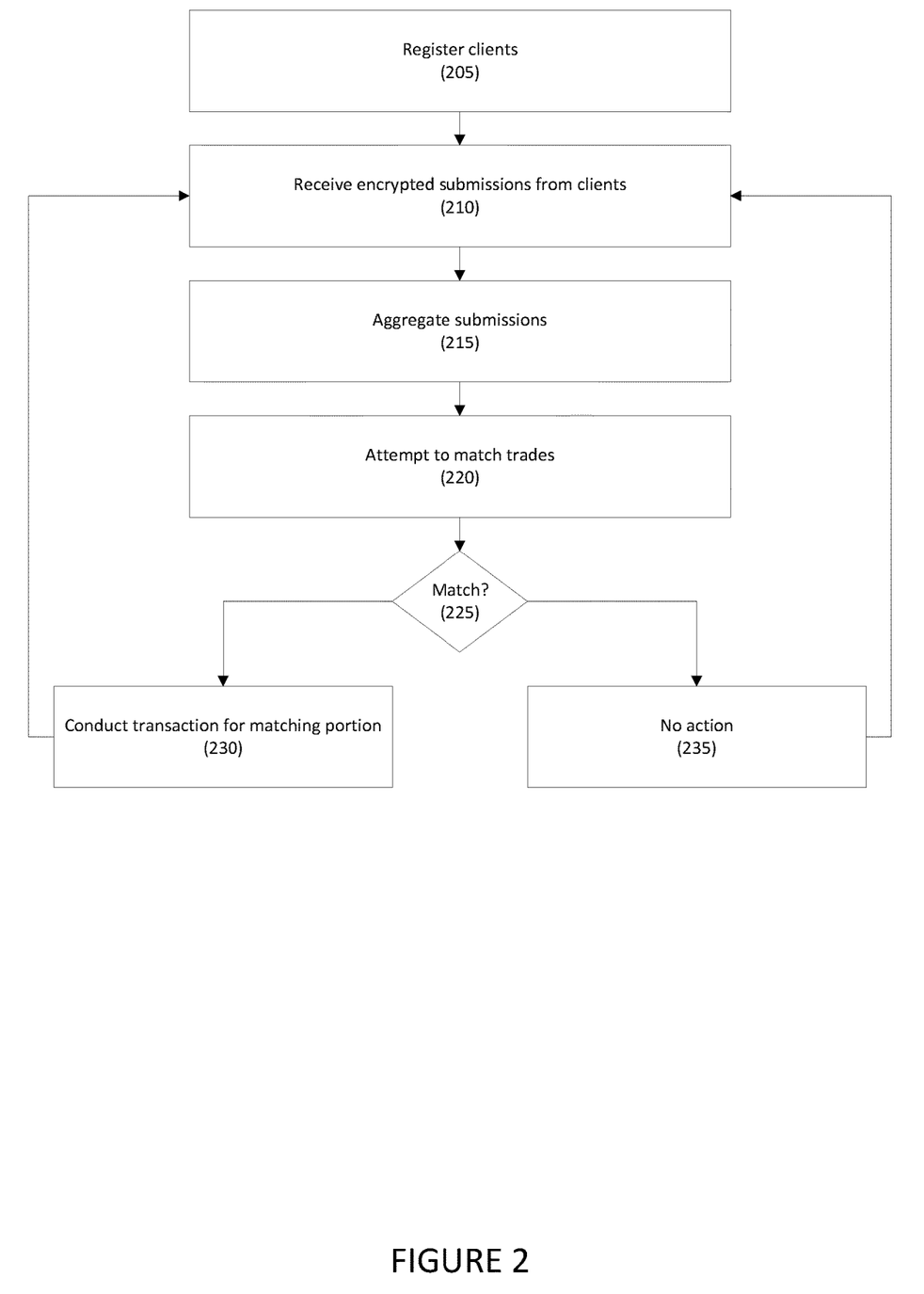
FIG. 2 depicts a method for privacy-preserving inventory matching according to one embodiment.

Referring to FIG. 2, a method for privacy-preserving inventory matching is disclosed according to one embodiment. The embodiment of FIG. 2 involves client-to-client inventory matching, such as matching a trade (e.g., a buy) from a first client's axe list to an opposite trade (e.g., a sell) on a second client's axe list.

In step 205, clients may be registered with the operator. In one embodiment, an operator, such as a financial institution, may execute a computer program or application that may register the clients.

In one embodiment, a secure multiparty computation ("MPC") may be used as part of the registration. For example, MPC allows a set of mutually distrustful parties to compute a function jointly over their inputs while maintaining the privacy of the inputs and ensuring the correctness of the outputs. Secure computation is beneficial in situations where the parties cannot trust each other, and cannot trust some external entity. When an incorruptible trusted party can be found, computing the joint function can be performed easily: the parties send their inputs to the trusted party, which computes the function on the inputs and send the parties the output of the computation. In many scenarios, however, the parties cannot rely or trust such an external entity, and secure computation comes to eliminate the need for such trusted party.

Figure 3:
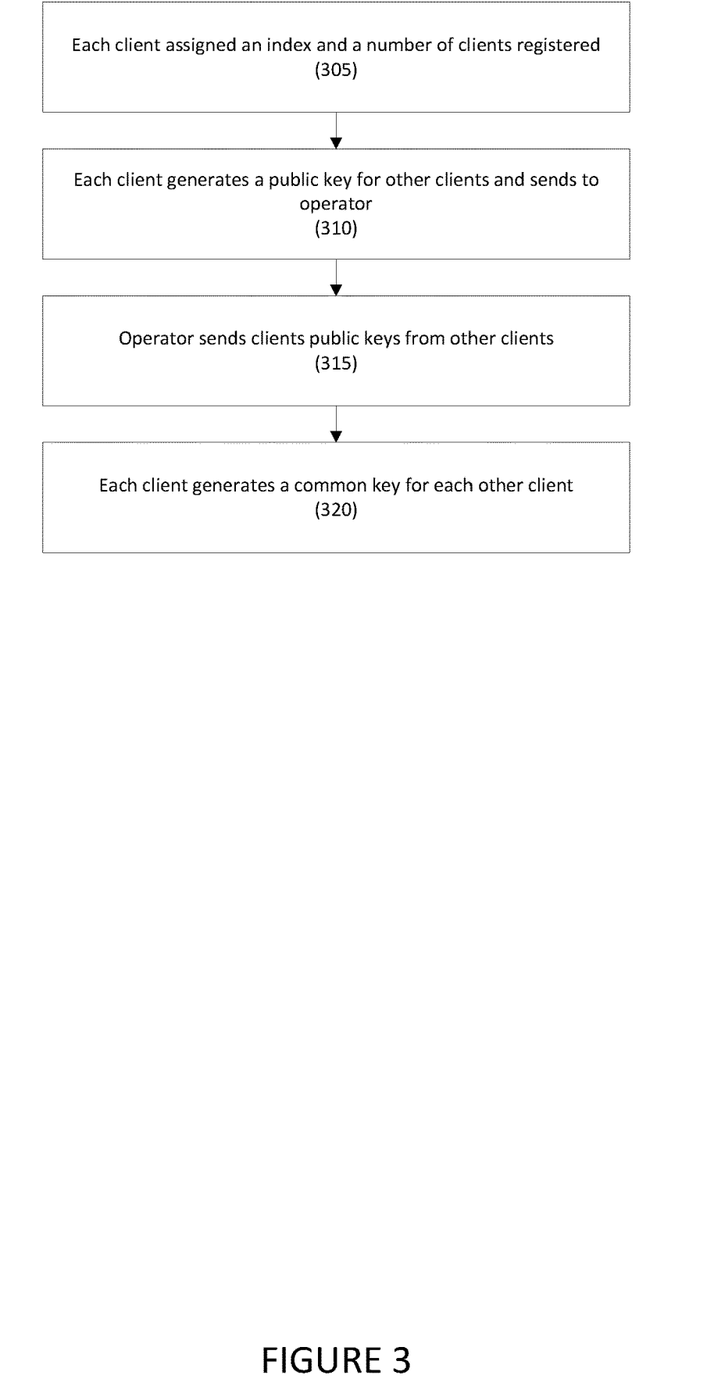
FIG. 3 depicts a client registration process according to one embodiment.

Referring to FIG. 3, a method for client registration is provided according to one embodiment.

In step 305, following authentication by the operator, each client may be assigned an index by the operator (e.g., the computer program). In one embodiment, the index may be assigned based on the order in which the client registers with the operator. Other index assignment schemes may be used as is necessary and/or desired.

In step 310, each client may generate a public key for each of the other clients and may provide them to the operator or the computer program. For example, if there are three clients, client A will generate public keys for client B ($pk_{AB}$) and client C ($pk_{AC}$). Client B will generate public keys for client A ($pk_{BA}$) and client C ($pk_{BC}$). And client C will generate public keys for client A ($pk_{CA}$) and client B ($pk_{CB}$). Each client then sends the public keys to the operator or the computer program.

In step 315, the operator or the computer program may send the clients the public keys from the other clients. For example, client A will receive public keys $pk_{BA}$ and $pk_{CA}$. Client B will receive public keys $pk_{AB}$ and $pk_{CB}$. And client C will receive public keys $pk_{AC}$ and $pk_{BC}$.

In step 320, each client will generate a common key for each client based on the public keys. Thus, client A may compute $key_{AB}$ and $key_{AC}$, client B may compute $key_{BA}$ and $key_{AC}$, and client C may compute $key_{CA}$ and $key_{CB}$.

Figure 4:
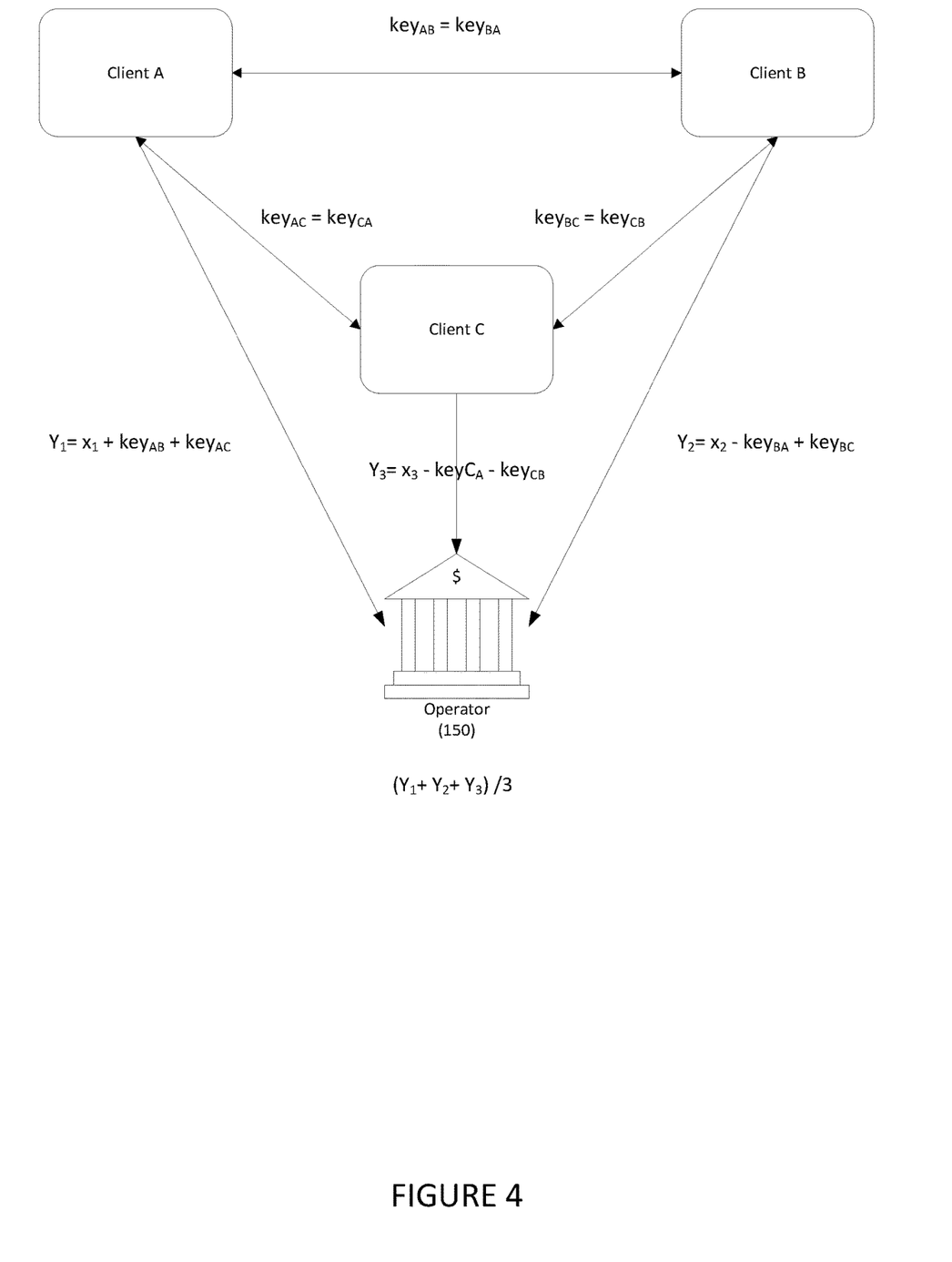
FIG. 4 graphically illustrates an example of a client registration process according to one embodiment.

A graphical representation of the key exchange in a three-party system is provided in FIG. 4.

Referring again to FIG. 2, in step 210, the operator or the computer program may receive encrypted submissions (e.g., each client's axe list) from one or more of the clients. In one embodiment, the submission may identify a transaction, such as a target, a buy or sell (i.e., long or short), a trade price, and a trade quantity.

In one embodiment, the buy or sell may be identified by an indicator (e.g., a 1 or 0) that indicates whether the action is to buy or sell.

For example, each client may submit its quantity and the shared random numbers with the other clients. The shared random numbers are either added or subtracted based the assigned indexes of the parties. Thus, client A with index 0 would add the common keys $key_{AB}$ and $key_{AC}$, client B with index 1 would subtract the common key $key_{AC}$ and add the common key $key_{AC}$, and client C, with the highest index, would subtract the common keys $key_{AB}$ and $key_{AC}$.

In one embodiment, a separate submission may be made for each trade listed on each client's axe list.

In one embodiment, the submission may be provided as a comma separated value ("CSV") file. Other formats maty be used as is necessary and/or desired.

In step 215, the operator or the computer program may aggregate the submissions. For example, the operator or the computer program may add the submissions from clients A, B, and C. Because of the way that the common keys are received, the common keys will cancel each other out, leaving the operator with only the sum of each client's submissions. An example of the aggregation is graphically illustrated in FIG. 4.

In one embodiment, the aggregated value may be hidden from the operator.

In one embodiment, step 215 may be optional, depending on the MPC protocol used. For example, a MPC protocol may not aggregate these values. Instead, a matching algorithm can try to find matches by brute forcing the orders instead of aggregating them in the first phase. In particular, the matching algorithm can take any pair of encrypted orders and compare them cryptographically (e.g., using a minimum protocol) to check if there is a match or not.

In one embodiment, step 215 may include additive homomorphic encryption. In this case, all the clients may submit their encrypted orders using a public key based on a (threshold) additive homomorphic encryption scheme. Then, all the Sell and all the Buy orders are aggregated by adding the encrypted orders (without decrypting them) using the additive homomorphic property of the encryption scheme. Once aggregation is done, the aggregation of all Buy and all Sell orders is revealed in a decryption process in which clients use their private key. Then, Yao's minimum protocol or any two party minimum protocol between the bank (which uses the revealed aggregated values) and the clients may be used in a first come, first served basis.

In step 220, after receiving at least two submissions, the operator may attempt to match client submissions. In one embodiment, the submissions are not decrypted, nor are the identities of the clients revealed to the operator during matching.

For example, the operator may iterate over the clients according to the order they submitted their requests, and may identify the number of shares each client can swap. Note that if a request cannot be facilitated, the number of shares the client was interested in is not exposed.

In one embodiment, the operator may determine a minimum match for each client. For example, the operator may perform a secure two-party computation protocol involving the operator and one client to compute the minimum of the aggregated quantity that the operator has and the quantity from the client. This may be performed on a first come, first served basis, based on a priority assigned to each party, or any other priority as is necessary and/or desired.

In one embodiment, Yao's Protocol may be used to compute the minimum (MIN) function, $f_{2P\text{-}Match}$. Yao's Protocol is described in Yehuda Lindell and Benny Pinkas, "A Proof of Security of Yao's Protocol for Two-Party Computation" J. Cryptology 22, 2 (2009), 161-188, and Andrew Chi-Chih Yao, "How to Generate and Exchange Secrets (Extended Abstract)," In 27th Annual Symposium on Foundations of Computer Science, Toronto, Canada, 27-29 Oct. 1986, 162-167, the disclosures of each of these documents is hereby incorporated, by reference, in its entirety.

If the aggregation process in step 215 is used, given the possible symbols to trade (Symb), the operator holds for every $\sigma \in Symb$ two integers—$L_\sigma$ and $S_\sigma$ from $[B] = \{0, \ldots, B-1\}$ for some bound B, indicating the availability of long and short exposure for that security a. For all symbols a, one of the two values $L_\sigma$, $S_\sigma$ equals 0. Similarly, for every $\sigma \in Symb$, the client holds two values $L'_\sigma, S'_\sigma \in [B]$, indicating how many shares it is willing to get exposure to. The output of the function is $\min\{L_\sigma, L'_\sigma\}, \min\{S_\sigma, S'_\sigma\}$ for every $\sigma \in Symb$, which represents the minimum for the party.

Referring back to FIG. 2, in step 225, if the minimum returns at least a partial match, in step 230, the transaction may be conducted for the matching portion between the two clients involved. In one embodiment, if a client's entire submission is not fulfilled (e.g., it wanted to trade 1000 shares, but only 600 shares were matched), the unmatched portion may not be decrypted.

If there are no matches, in step 235, no action is taken.

Figure 5:
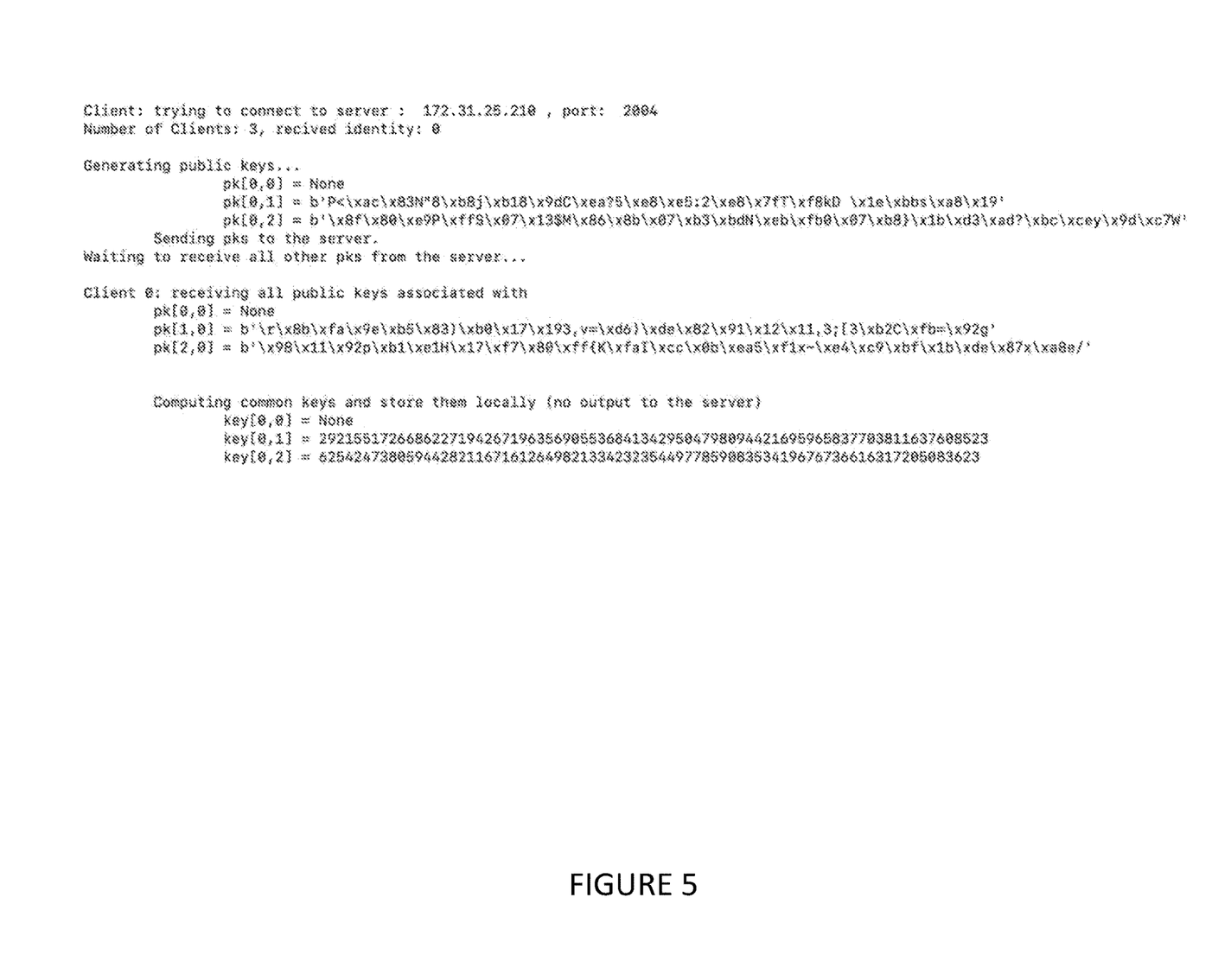
FIG. 5 depicts an example of client registration according to one embodiment.

Examples are provided in FIGS. 5-8A and 8B. FIG. 5 depicts an example of a client computer registering with an operator. For example, the client receives an index (0) and a total number of clients (3). The client generates public keys (pk [0, 1] and pk [0,2]) for the other two clients (i.e., clients with index 1 and 2) and sends them to the operator. The client then receives the public keys pk [1,0] and [2,0] from the operator and for the other two clients. It then computes common keys (i.e., key [0,1] and key [0,2]) for the other clients and stores those keys locally.

Figure 6:
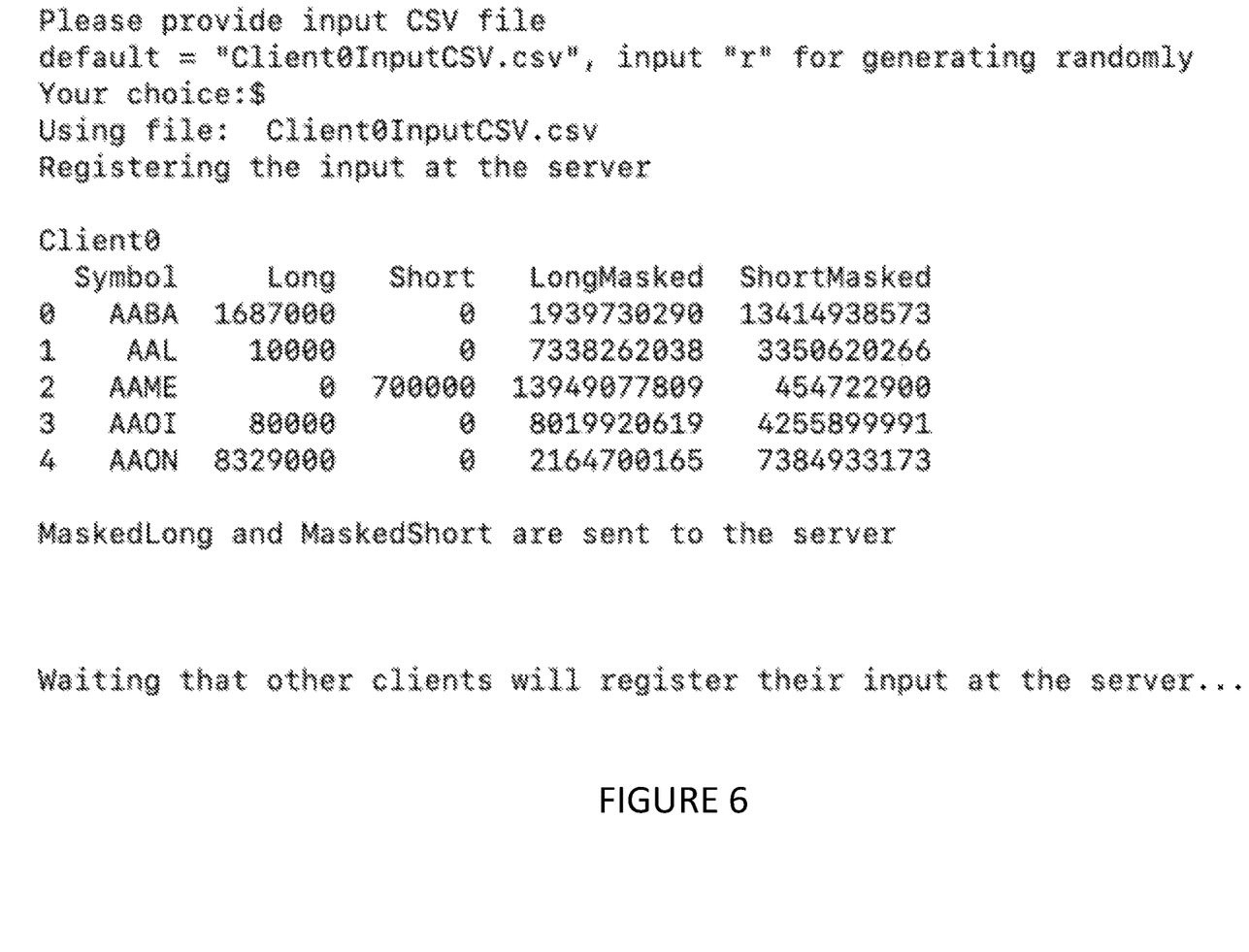
FIG. 6 depicts an example of a client submission according to one embodiment.

FIG. 6 depicts an example of a client axe list submission. For each symbol, and using the common keys from the other clients, the client generates a masked long value, and a masked short value. Those values, with the symbol, are communicated to the operator.

Figure 7:
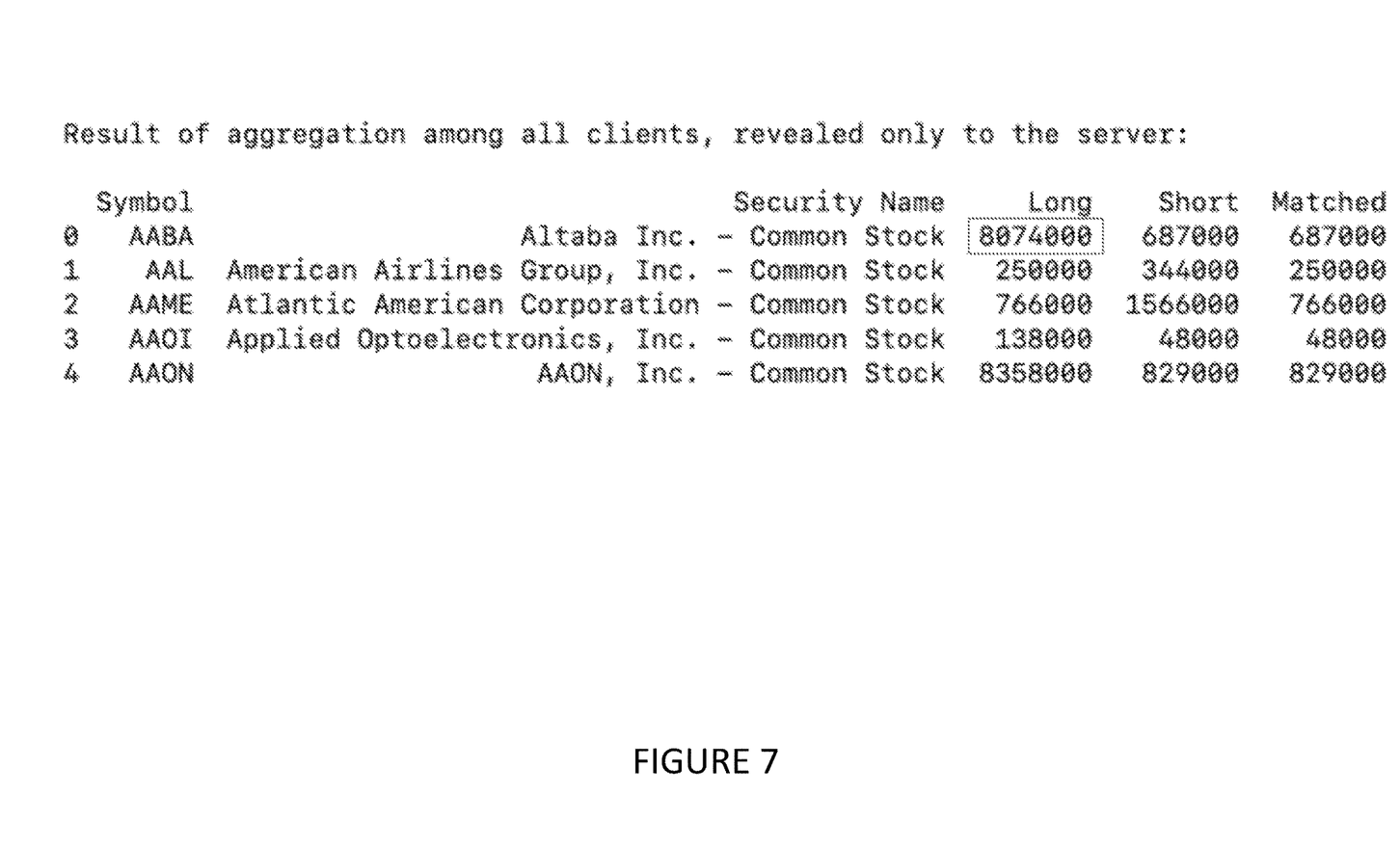
FIG. 7 depicts an example of the results of aggregation according to one embodiment.

FIG. 7 depicts a result of the aggregation at the operator following all client submissions.

Figure 8A:
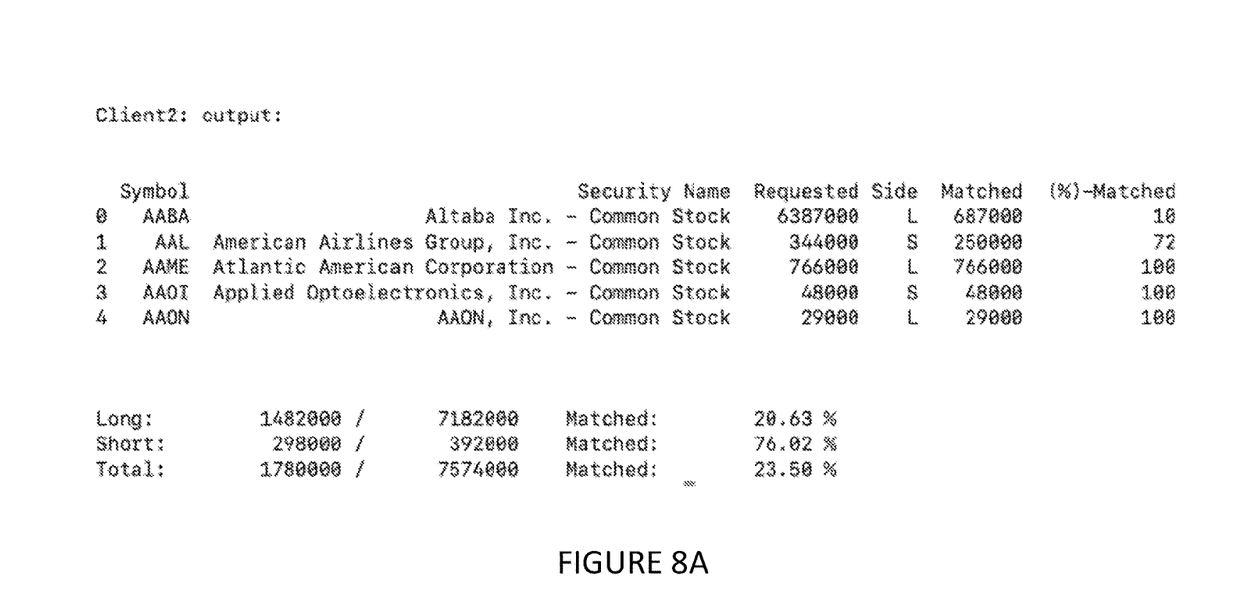
FIGS. 8A and 8B depict examples of a client output and minimum matching according to one embodiment.
Figure 8B:
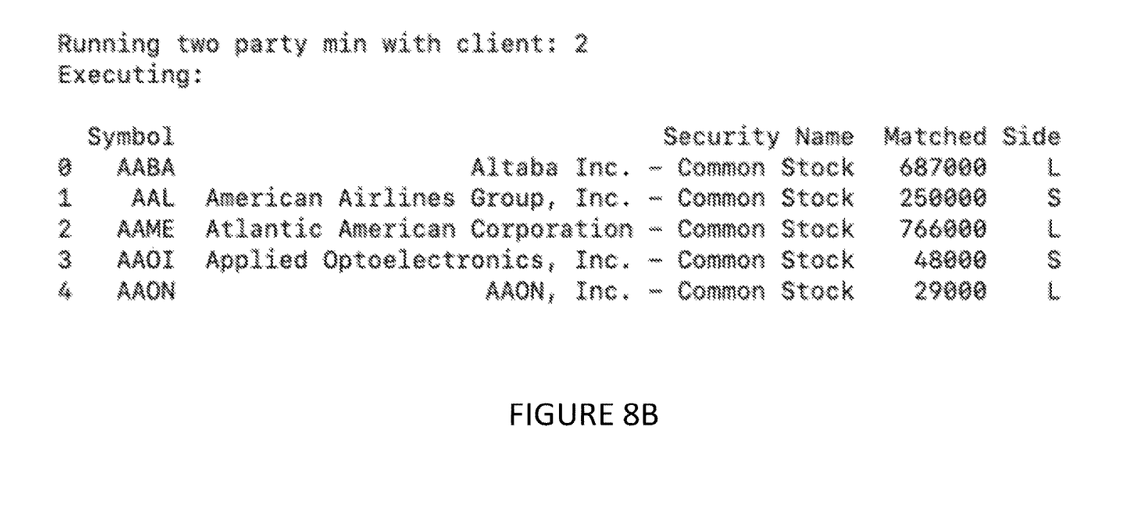

FIG. 8A depicts an output at client 2 following aggregation, and FIG. 8B depicts the execution of trades following the aggregation.

In embodiments, the operator's s axe list and a client's axes are provided in an encrypted way to the matching engine.

Although several embodiments have been disclosed, it should be recognized that these embodiments are not exclusive to each other, and certain elements or features from one embodiment may be used with another.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating systems, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user. Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for inventory matching, comprising:
   in an information processing apparatus comprising at least one computer processor:
   receiving, from a first client application, a first masked submission, wherein:
     the first masked submission includes a first masked long value and a first masked short value for a symbol;
     the first masked long value and the first masked short value are generated using a first common key; and
     the first common key is computed using a first public key generated by the first client application and a second public key generated by a second client application;
   receiving, from the second client application, a second masked submission, wherein:
     the second masked submission includes a second masked long value and a second masked short value for the symbol;
     the second masked long value and the second masked short value are generated using a second common key; and
     the second common key is computed using the first public key generated by the first client application and the second public key generated by the second client application;
   aggregating the first masked submission and the second masked submission, wherein the aggregating includes:
   canceling the first common key and the second common key against each other; and
   providing a first sum based on the first masked submission and a second sum based on the second masked submission;
   identifying a number of shares of the symbol that can be traded based on the first sum based on the first masked submission and the second sum based on the second masked submission; and
   conducting a trade of the identified number of shares between the first client application and the second client application.

2. The method of claim 1, wherein the masked submissions are submitted using a secure Multi-Party Computation (MPC) cryptographic protocol.

3. The method of claim 1, wherein the masked submissions are submitted using an additive or fully homomorphic encryption scheme.

4. The method of claim 1, wherein an identity of a first client user of the first client application and an identity of a second client user of the second client application is not revealed until the trade is conducted.

5. The method of claim 1, where a secure Multi-Party Computation (MPC) cryptographic protocol is used to implement a matching algorithm.

6. The method of claim 1, where an additive homomorphic encryption scheme is used to implement a matching algorithm.

7. The method of claim 4, wherein at least one of the first client user and the second client user is an online client.

8. The method of claim 4, wherein at least one of the first client user and the second client user is a fail-stop client.

9. The method of claim 4, wherein at least one of the first client user and the second client user commits to executing the trade.

10. The method of claim 1, wherein a buy or sell indication included in the masked submissions is represented as a 1 or 0, respectively.

11. A non-transitory computer readable storage medium, including instructions stored thereon, wherein the instructions, when read and executed by one or more computers, cause the one or more computers to perform steps comprising:
- generating, at a first client application, a first public key;
- generating, at a second client application, a second public key;
- receiving, at the first client application, the second public key;
- receiving, at the second client application, the first public key;
- computing, by the first client application, a first common key based on the first public key and the second public key;
- computing, by the second client application, a second common key based on the first public key and the second public key;
- generating, at the first client application, a first masked submission, wherein the first masked submission includes a first masked long value and a first masked short value for a symbol generated using the first common key;
- submitting the first masked submission to an operator server;
- generating, by the second client application, a second masked submission, wherein the second masked submission includes a second masked long value and a second masked short value for the symbol generated using the second common key;
- submitting the second masked submission to the operator server;
- aggregating, by the operator server, the first masked submission and the second masked submission, wherein the aggregating includes:
  - canceling the first common key and the second common key against each other; and
  - providing a first sum based on the first masked submission and a second sum based on the second masked submission;
- identifying, by the operator server, a number of shares of the symbol that can be traded based on the first sum based on the first masked submission and the second sum based on the second masked submission; and
- conducting a trade of the identified number of shares between the first client application and the second client application.

* * * * *